Feb. 5, 1946.  H. B. BROSE  2,394,144
FORCE COLLAR
Filed Dec. 14, 1944
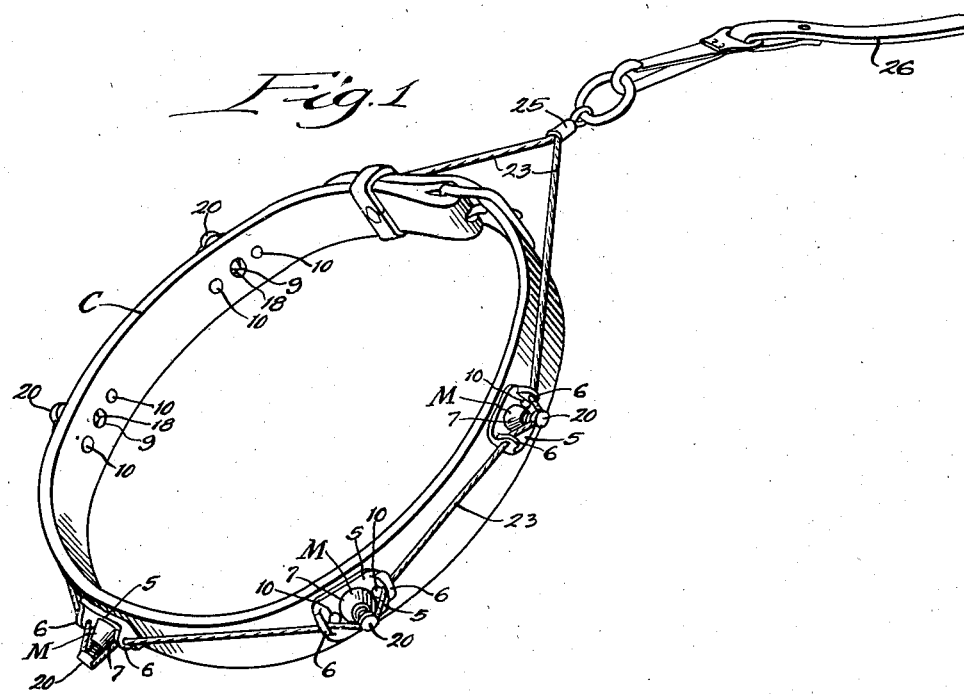
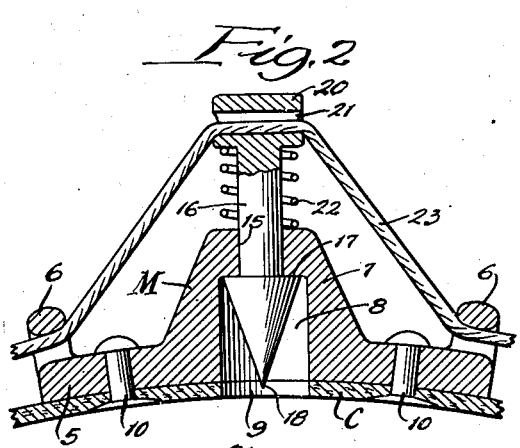
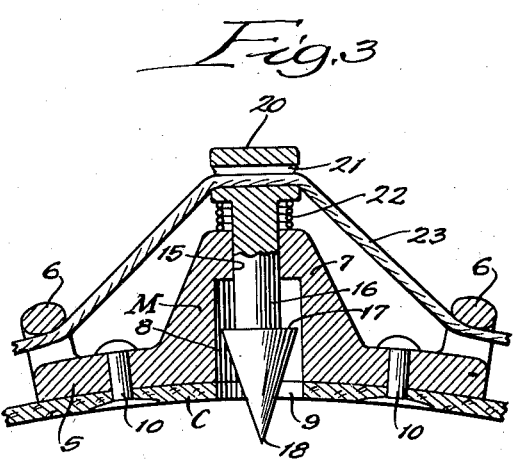
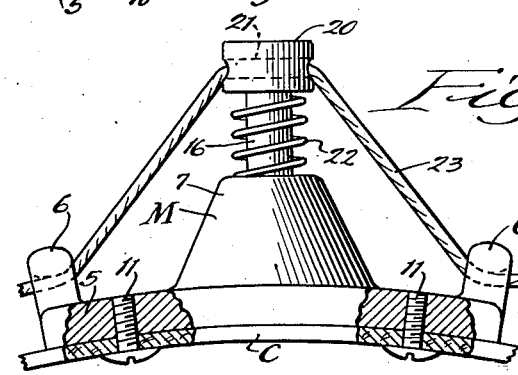
Inventor:
Horace B. Brose,
By Banning & Banning
Attorneys Patented Feb. 5, 1946

2,394,144

UNITED STATES PATENT OFFICE 2,394,144

FORCE COLLAR

Horace B. Brose, Chicago, Ill.

Application December 14, 1944, Serial No. 568,180

4 Claims. (Cl. 119—106)

This invention relates to a force collar—a type of collar that is commonly used to assist in the training of dogs and other animals.

For its objects, my invention aims to provide a plurality of inwardly movable points adapted, in response to tensioning of a leash, to be advanced whereby to prod the animal around whose neck the collar is fitted. These points are normally maintained in an outer non-contacting position ready to be advanced at any time. In this way no painful sensation is produced except when the trainer finds it necessary to advance the points to enforce obedience.

In the present force collar, I utilize a plurality of mountings, spaced apart around the collar and interconnected by a flexible operating medium, such as a heavy cord, whose end (or ends) may constitute, or be tied to, a leash. By exerting the requisite pulling force, this flexible operating means causes the several points to be advanced inwardly in unison. Upon relaxation, however, these points automatically retract to produce a normal condition of comfort. The construction of these movable points, together with their mountings on the collar, and interconnection for operation in unison, constitutes an important aspect of my invention.

A suggestive embodiment of my improved force collar is illustrated in the drawing wherein Figure 1 is a view in perspective showing the collar as it appears with the leash attached;

Fig. 2 is an enlarged detail in section, taken diametrically of the collar, showing attached thereto one of the mountings for the movable points;

Fig. 3 which is a similar view shows the point advanced to prodding position; and Fig. 4 which is a view similar to Fig. 2 shows a modification of the means for attaching the mountings to the collar.

The material and general construction of the collar C may be conventional. It is designed to be fitted and secured around the neck of an animal to be trained. As shown, the collar is in the general form of a band to the exterior of which is fitted a plurality of mountings M, each having an elongated base 5 formed with an eye 6 adjacent its opposite ends. Intermediately of its ends the mounting is formed with an outwardly extended boss 7 interiorly chambered as at 8 with an opening at its inner end in register with an opening 9 through the collar. As by means of rivets 10 (or screws 11—see Fig. 4) extending through the base and collar, each mounting may be secured immovably in place.

The outer chamber end is formed with a bore 15 through which is extended a shank 16 formed with an enlarged shoulder 17 terminating in a point 18. When the shank is moved outwardly to its limit, the shoulder is engaged with the outer end of the boss (see Fig. 2), the point being then retracted outwardly from the space within the collar.

The shank which extends exteriorly beyond the boss carries at its outer end a head 20 formed with an eye 21. Coiled around the shank is a spring 22 extending between the head and the outer end of the boss. While the spring normally maintains the shank in an outer or retracted position, the head eye 21 remains always to the outside of the base eyes 6 so that tensioning of a flexible operating medium, such as a cord 23 which is extended through all these eyes, will produce a radial force tending to advance the shank inwardly.

In use, the flexible operating cord interconnecting the several mountings is threaded through their several base and shank eyes, as shown in Fig. 1, the ends of the cord being then brought together in a fitting 25, or otherwise secured, to facilitate attachment thereto of a leash 26. With tensioning of this leash, a pull is transmitted through the cord thereby exerting, in unison, an inward force on the several shanks to advance their pointed ends inwardly of the collar. In this way the animal under training suffers a prodding in the neck—a sensation which is calculated to enforce obedience.

It will be noted that the present collar mountings are simple, compact, and light, and consequently do not add appreciably to the weight or bulk of the collar. In addition, the movable points are normally maintained out of contact with the animal, and it is only when measures are required, as by pulling upon the leash, that these points are advanced inwardly to accomplish their intended purpose. At all other times, the points are held out of contact position, thereby tending to enforce the lesson that, with obedience, discomfort will be avoided.

I claim:

1. A force collar having a guide mounting extending outwardly thereof, a pointed shank guidingly supported by the mounting and axially movable thereof inwardly of the collar, a plurality of eyes at spaced points around the collar together with an eye at the outer end of each shank, tension means normally retracting the shank point outwardly of the inner face of the collar, and flexible operating means extending through the several eyes including those of the shanks and extending away from the collar adapted to serve as a leash therefor and, when tensioned, to advance the shank point inwardly of the collar beyond the inner face thereof.

2. A force collar having a plurality of spaced guide mountings extending outwardly thereof, a pointed shank guidingly supported by each mounting and movable to present its point inwardly of the collar, tension means normally retracting each shank point outwardly of the inner face of the collar, a plurality of eyes at spaced points around the collar together with an eye at the outer end of each shank, and a single flexible operating means extending through the several eyes of the shanks and collar and extending away therefrom to serve as a leash therefor and, when tensioned, to advance the several shank points in unison inwardly of the collar beyond the inner face thereof.

3. A force collar having a plurality of spaced mountings extending outwardly thereof and each formed adjacent the collar with an eye, a shank with an eye at one end and a point at the other supported by each mounting and movable to advance its point inwardly beyond the inner face of the collar, tension means normally retracting each shank to remove its point outwardly of the inner face of the collar, means for limiting outward movement of the shank to a fixed distance, and a single interconnecting flexible operating means extending through the eyes of the several mountings and shank and extending away from the collar to serve as a leash therefor and, when tensioned, to advance the several shank points in unison inwardly of the collar beyond the inner face thereof.

4. A force collar having a plurality of spaced mountings extending outwardly thereof, each mounting comprising an elongated base adapted to fit against and be secured to the collar, an eye adjacent each base end and intermediately thereof an outwardly extending boss formed with a chamber opening on to the inner end of the boss and in register with an opening through the collar, the outer chamber end being formed with a bore therethrough, a shank extending through the bore and reciprocable therein, an enlarged shoulder on the shank terminating in a point at the inner shank end, the shoulder being engageable with the outer end of the chamber to limit the shank movement in that direction, the outer end of the shank being extended to a point exteriorly of the boss and terminating in a head through which is an eye disposed outwardly of the collar a greater distance than the base eyes, a spring coiled around the shank and extending between its head and the outer end of the boss and normally urging the shank outwardly, and a flexible operating means extending through the two base eyes and the shank eye therebetween of each mounting and extending away from the collar to serve as a leash therefor and, when tensioned, to advance the several shanks inwardly in unison whereby to position their points beyond the inner face of the collar.

HORACE B. BROSE.